(12) United States Patent
Moreno

(10) Patent No.: US 12,342,055 B2
(45) Date of Patent: Jun. 24, 2025

(54) SIMULTANEOUS RECORDING AND UPLOADING OF MULTIPLE AUDIO FILES OF THE SAME CONVERSATION AND AUDIO DRIFT NORMALIZATION SYSTEMS AND METHODS

(71) Applicant: Descript, Inc., San Francisco, CA (US)

(72) Inventor: Zachariah Steven Moreno, Alameda, CA (US)

(73) Assignee: Descript, Inc., San Francisco, CA (US)

( * ) Notice: Subject to any disclaimer, the term of this patent is extended or adjusted under 35 U.S.C. 154(b) by 0 days.

(21) Appl. No.: 18/061,609

(22) Filed: Dec. 5, 2022

(65) Prior Publication Data

US 2023/0156298 A1  May 18, 2023

Related U.S. Application Data

(63) Continuation of application No. 17/119,764, filed on Dec. 11, 2020, now Pat. No. 11,540,030.

(60) Provisional application No. 62/947,490, filed on Dec. 12, 2019.

(51) Int. Cl.
| | |
|---|---|
| *H04N 21/854* | (2011.01) |
| *G06F 16/11* | (2019.01) |
| *G06F 16/16* | (2019.01) |
| *G06F 16/61* | (2019.01) |
| *G11B 27/034* | (2006.01) |
| *H04L 65/70* | (2022.01) |
| *H04L 67/02* | (2022.01) |
| *H04L 67/06* | (2022.01) |
| *H04L 67/10* | (2022.01) |
| *H04N 21/845* | (2011.01) |
| *H04L 9/40* | (2022.01) |

(52) U.S. Cl.
CPC ..... *H04N 21/85406* (2013.01); *G06F 16/116* (2019.01); *G06F 16/166* (2019.01); *G06F 16/61* (2019.01); *G11B 27/034* (2013.01); *H04L 65/70* (2022.05); *H04L 67/02* (2013.01); *H04L 67/06* (2013.01); *H04L 67/10* (2013.01); *H04N 21/8456* (2013.01); *H04L 63/10* (2013.01)

(58) Field of Classification Search
CPC ......... H04L 67/02; H04L 51/04; H04L 65/09; G06F 16/166; G06F 16/116; G06F 16/61; H04N 21/8456; H04N 21/2368; H04N 21/4341; H04N 21/4307; H04N 5/783
See application file for complete search history.

(56) References Cited

U.S. PATENT DOCUMENTS

| | | | | |
|---|---|---|---|---|
| 10,271,079 | B1* | 4/2019 | Woschank | ......... H04N 21/4788 |
| 10,742,733 | B2* | 8/2020 | Scurrell | .................. H04W 4/80 |
| 2005/0008038 | A1* | 1/2005 | Peeters | ................... H04L 1/188 |
| | | | | 370/428 |
| 2012/0045062 | A1* | 2/2012 | Kuno | ............... G11B 20/00086 |
| | | | | 380/277 |

(Continued)

OTHER PUBLICATIONS

Mardan, A. (2018). Setting up Node.js and Other Essentials. In: Practical Node.js. Apress, Berkeley, CA. https://doi.org/10.1007/978-1-4842-3039-8_1 (Year: 2018).*

*Primary Examiner* — Chirag R Patel
(74) *Attorney, Agent, or Firm* — Perkins Coie LLP; Andrew T. Pettit; Willa Wu

(57) ABSTRACT

The invention relates to simultaneous recording and uploading systems and methods, and, more particularly to a simultaneous recording and uploading multiple files from the same conversation.

14 Claims, 3 Drawing Sheets

(56) References Cited

U.S. PATENT DOCUMENTS

| | | | | |
|---|---|---|---|---|
| 2017/0180780 A1* | 6/2017 | Jeffries | ............ | H04N 21/43072 |
| 2017/0366591 A1* | 12/2017 | Thomas | ............... | H04N 21/236 |
| 2018/0301169 A1* | 10/2018 | Ricciardi | ............. | G11B 27/036 |
| 2022/0232262 A1* | 7/2022 | Nicholson | ............ | H04N 21/233 |

* cited by examiner

SIMULTANEOUS RECORDING AND UPLOADING OF MULTIPLE AUDIO FILES OF THE SAME CONVERSATION AND AUDIO DRIFT NORMALIZATION SYSTEMS AND METHODS

CROSS-REFERENCE TO RELATED APPLICATION

This application claims priority from U.S. Provisional Patent Application No. 62/947,490, filed Dec. 12, 2019, titled SIMULTANEOUS RECORDING AND UPLOADING OF MULTIPLE AUDIO FILES OF THE SAME CONVERSATION AND AUDIO DRIFT NORMALIZATION SYSTEMS AND METHODS and a continuation of U.S. patent application Ser. No. 17/119,764 filed on Dec. 11, 2020 entitled SIMULTANEOUS RECORDING AND UPLOADING OF MULTIPLE AUDIO FILES OF THE SAME CONVERSATION AND AUDIO DRIFT NORMALIZATION SYSTEMS AND METHODS the disclosure of which is incorporated by reference in its entirety herein for all purposes.

FIELD OF THE INVENTION

The invention relates to simultaneous recording and uploading systems and methods, and, more particularly to a simultaneous recording and uploading of multiple files from the same conversation. Further, the present invention relates to audio drift normalization, and more particularly to audio drift normalization systems and methods that can normalize audio drift of a plurality of recordings from a source.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office files or records, but otherwise reserves all copyrights whatsoever.

BACKGROUND OF THE INVENTION

As advances in internet communications including video and audio mediums continue to increase, the need to effectively and efficiently communicate and create media across a broad spectrum of platforms has also increased. Many of the communications platforms configured to communicate recordings cannot ensure that the data is accessible in the event of a problem with the recording process and minimize or eliminate the need to record the complete session prior to uploading or produce quality media recordings.

Previous attempts to create systems and methods to ensure that the data is accessible in the event of a problem with the recording process and minimize or eliminate the need to record the complete session prior to uploading or produce quality media recordings, have been unsuccessful, time consuming and costly.

These previous attempts have necessitated additional hardware, systems, time expenditure, and costs. Previous attempts to address these problems have not been efficient or successful.

In many instances, podcasters, audio book producers, and content creators find themselves spending time, effort, and extra costs to produce quality video and/or audio recordings. These additional logistical steps increase operating costs and increase the time needed to publish video and/or audio works. These previous methods needed to record an audio and/or video file in its entirety before being uploaded to the cloud.

Further, these methods require additional system resources to be present within a recording device thereby increasing overhead of systems and methods.

Quite often recording professionals find themselves spending additional time waiting for large files to upload after a recording is finished.

Many of the communications platforms configured to communicate recordings require systems, methods, and logistical intervention to correct or adjust recordings for irregularities. Some of these irregularities include drift between multiple collaborators, lack of synchronization, and data inconsistency.

Previous attempts to create systems and methods to correct or minimize drift in recordings have necessitated additional hardware, systems, time expenditure, and costs. Previous attempts to address these problems have not been successful.

Further, imperfections in recordings can cause drift. Specifically, audio drift requires efforts to realign each audio file to the actual timing for it to be usable in products, adding time and work for producers and audio engineers in post-production.

Quite often recording professionals find themselves realigning audio recordings in post-production to correct recordings with drift or that are out of sync.

When multiple systems are recording, and two or more audio recordings of the same conversation are captured on multiple devices, reconstruction and integration of the recordings require a process to normalize the drift that arises between the two or more audio recordings. Therefore, audio drift results in the need to realign each audio file to the actual timing for a usable product. This adds time and work for producers and audio engineers in post-production.

Another problem can occur when the recording process utilizes segments or chunks of data based on a preset time period and the recording being transferred at different times. The recording assembly system must take all the chunks and write them into one file. In doing so they need to ensure that the data is captured, is continuous, and mixed together. This assembly can result in audio drift.

Additionally, combining recordings from a plurality of sources often requires alignment of the waveforms to eliminate the over writing of each other when they are out of phase. This condition requires additional steps, costs, and time to publish works.

What is needed in the art is a solution to address issues with recording and uploading of audio and video files. Additionally, there is a need for a solution to address audio drift issues.

SUMMARY OF THE INVENTION

The invention in one form is directed to a method that ensures that recorded audio and video files are always accessible in the event of a catastrophe, removes the need for the audio and video file to exist in its entirety before uploading and requires less system resources be present within the recording device.

The invention in another form improves the reliable access to complete audio files and reduces time waiting for large files to upload after a recording is finished.

The invention in yet another form allows for the use of low-end devices due to the efficiency of the recording system.

In yet another form, the invention improves over existing chunk style recording methods.

In another embodiment, the system can also include algorithms and/or software which eliminate manual processes to perform system processes and utilize methods.

In yet another embodiment, the system can include methods to perform chunk style recording to produce synchronized recordings.

In an aspect, the system can include processes to normalize audio drift that arises between two or more audio recordings of an original source that is captured on one or a plurality of devices.

In another aspect, the system can also include components that are configured to minimize human interaction and/or executed steps to produce enhanced audio and video quality recordings. These recordings are designed to produce top grade audio recordings, the recordings configured to be combined in other audio and/or video recordings without the need for back end engineering to improve quality of the recordings.

In yet another aspect, the system can include systems configured to provide near real-time interview capability with video and record everyone's audio in separate media files without drift.

In an embodiment, the system can include a platform which provides a medium to connect podcast hosts, co-hosts, & guests to record studio quality audio and video from anywhere.

In another embodiment, the system can also include allowing system users to download, listen, and share one or all of user's recordings organized by any parameter, including but not limited to session, date, geography and/or recording medium.

In yet another embodiment, the system can also include a video feature so a podcaster and a guest can see each other while recording.

In an aspect, the system can include mobile applications and can be utilized on a mobile device.

In another aspect, the system can also include laptops, desktop computers, and computing mediums.

In yet another aspect, the system can include utilizing a standardized 48 kHz sampling rate.

In an embodiment, the system can include processes which do not require echo cancellation (Acoustic Echo Cancellation (AEC) Software).

In another embodiment, the system can also include remote audio signals and can exist on the cloud/web within a network.

In yet another embodiment, the system can include saving recordings in buffers of any length of time, preferably between 2 and 8 seconds. The system can also utilize resampling to 48 kHz.

In an aspect, the system can include longform recordings, exceeding one hour in length.

In an aspect, the system can reduce the need for local storage and is unbounded in the duration of recording.

In another aspect, the system can also include components and/or methods which are non-destructive wherein no data is lost.

In yet another aspect, the system can include systems and/or methods that do not utilize a master clock or drift threshold.

In an embodiment, the system can include methods and/or components which normalize audio drift from different sources.

In another embodiment, the system can include quality, reliable, repeatable, systems efficient enough to utilize low end devices.

In another embodiment, the system can be used alongside aviation flight data recording systems to reduce the need to search for the "black box" because the recordings are not stored locally.

According to an aspect of the present invention, an audio drift normalization system is presented. The system can ensure that recorded audio files are automatically modified to correct audio drift arising from a plurality of recording devices and/or buffer size differences.

In another embodiment, the system can also include algorithms and/or software which eliminate manual processes to correct audio drift.

In yet another embodiment, the system can include methods to perform chunk style recording to produce synchronized recordings.

In an aspect, the system can include processes to normalize audio drift that arises between two or more audio recordings of an original source that is captured on one or a plurality of devices.

These and other features and advantages will become apparent from the following detailed description of illustrative embodiments thereof, which is to be read in connection with the accompanying drawings.

BRIEF DESCRIPTION OF THE DRAWINGS

The features and advantages of the present invention will be better understood when the Detailed Description of the Preferred Embodiments given below is considered in conjunction with the figures provided.

DETAILED DESCRIPTION

Figure 1:
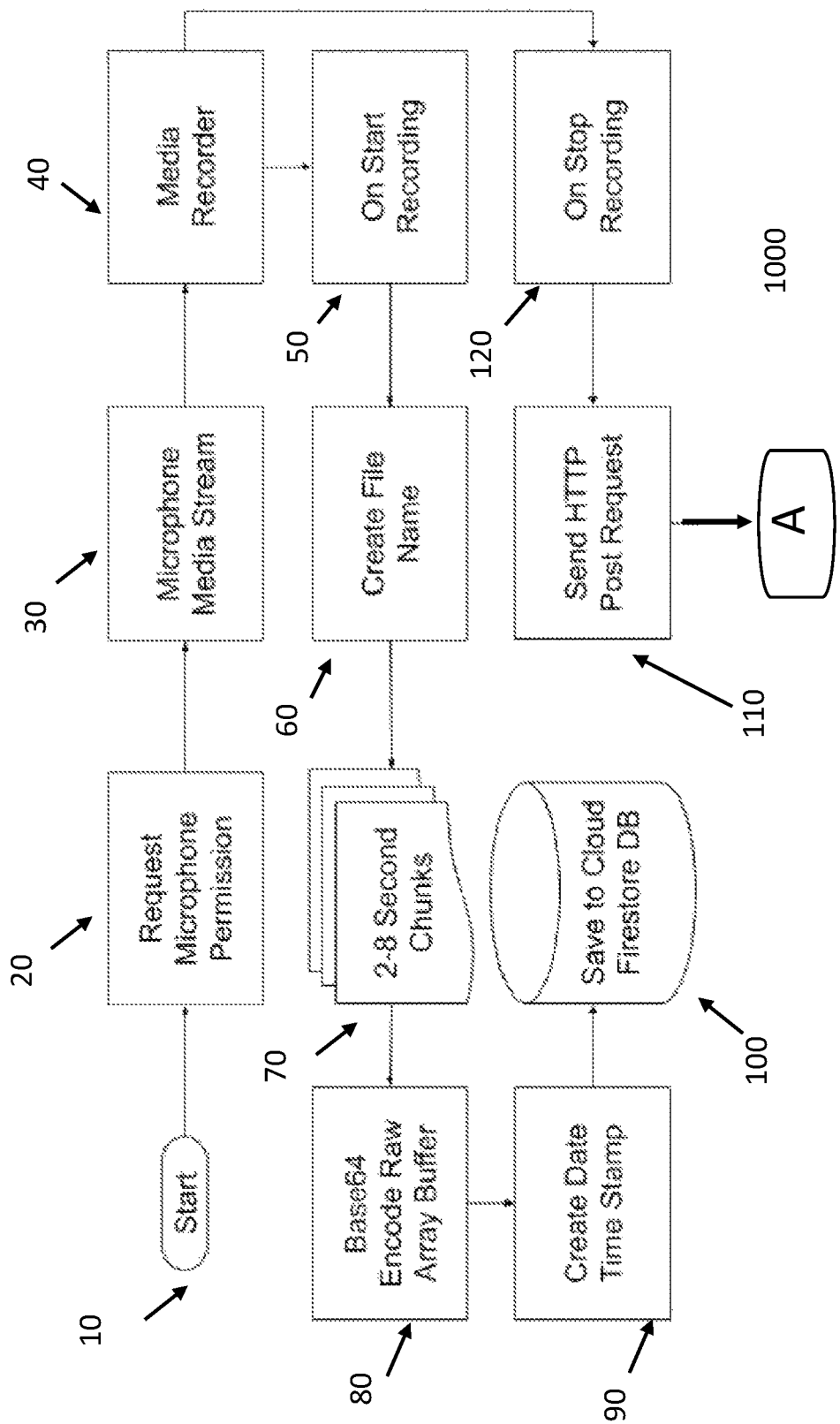
FIG. 1 is a method flowchart for simultaneous recording audio files in accordance with an embodiment of the present invention.

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

With respect to the term chunks when used by the instant invention may refer to segments of audio and/or video recordings.

The terms media recordings, audio recordings, video recordings may be used interchangeably and mean a recording of the using a media capture device such as a microphone or video camera.

The terms media data media files, audio data, audio files, video data, video files may be used interchangeably and mean data stored on a computer representing the data of the captured media.

The term WAV, MP3, MPS, audio, video file, AVI (Audio Video Interleave), FLV (Flash Video Format), WMV (Windows Media Video), MOV (Apple QuickTime Movie), MP4 (Moving Pictures Expert Group 4) may be used interchangeably within the specification and are all forms of media files.

The term cloud when used in context by the instant invention can mean Amazon cloud, Google cloud, Verizon cloud or any suitable cloud storage system.

The term computing device capable may include any type of device for computing, such as a tablet, mobile device, smart speaker, flight data recorder, or computer that may be in communication with a media recording device such as a microphone or video camera.

The term public URL is a URL that can be asked by anyone on the Internet as it is indexed by search engines.

The term video file format is a type of file format for storing digital video data on a storage device such as a computer system. Video is almost always stored using compression to reduce the file size. A video file normally consists of a container containing video data in a video coding format alongside audio data in an audio coding format.

The term stereo commonly refers to Stereophonic sound and is the reproduction of sound, using two or more independent audio channels, through a symmetrical configuration of loudspeakers, in such a way as to create a pleasant and natural impression of sound heard from various directions, as in natural hearing.

The term monophonic sound commonly called mono sound, mono, or non-stereo sound, this early sound system used a single channel of audio for sound output. In monophonic sound systems, the signal sent to the sound system encodes one single stream of sound and it usually uses just one speaker or the same exact sound in both speakers.

When the term database is used within the specification it can alternatively mean any suitable storage medium can be substituted such as a data structures, files, stacks utilizing Direct access storage device (DASD) or non-volatile computer storage an example of which is solid state storage medium.

The term audio file format is a file format for storing digital audio data on a computer system. The bit layout of the audio data (excluding metadata) is called the audio coding format and can be uncompressed, or compressed to reduce the file size, often using compression. The data can be a raw bitstream in an audio coding format, but it is usually embedded in a container format or an audio data format with defined storage layer.

Typical audio recording devices tend to sample audio at one of two different rates, 44.1 kHz or 48 kHz.

There are three major groups of audio file formats:

Uncompressed audio formats, such as WAV, AIFF, AU or raw header-less PCM;

Formats with lossless compression, such as FLAC, Monkey's Audio (filename extension.ape), WavPack (filename extension.wv), TTA, ATRAC Advanced Lossless, ALAC (filename extension.m4a), MPEG-4 SLS, MPEG-4 ALS, MPEG-4 DST, Windows Media Audio Lossless (WMA Lossless), and Shorten (SHN).

Formats with lossy compression, such as Opus, MP3, Vorbis, Musepack, AAC, ATRAC and Windows Media Audio Lossy (WMA lossy).

Specifically, Opus is a lossy audio coding format and standardized by the Internet Engineering Task Force, designed to efficiently code speech and general audio in a single format, while remaining low-latency enough for real-time interactive communication and low-complexity enough for low-end embedded processors. However, when used in the specification the invention can utilize any lossy compression method.

Any embodiment of the invention disclosed can be used with any media, audio or video file format and all terms are used interchangeably.

Embodiments of the invention can be divided into three separate applications. The first is within a Client Server software architecture, i.e., a web application, and the second is within a cloud-based Server which sends and or receives data from the client server software, and the third can be the audio drift normalization where the audio is synchronized. However, the audio drift normalization can be implemented with a different architecture which can provide required inputs and is capable of utilizing the specific output of the audio drift normalization application.

Typical audio drift algorithms can be selected from the group consisting of drift correction modulation, clock drift compensation techniques and multimedia decoding device. European patent specification EP 2038886 B1 inventor Abrol publication date Nov. 4, 2012 discloses various techniques to achieve clock drift compensation for audio decoding and the disclosure of which is incorporated by reference herein for all purposes.

Referring now to the Client Server software architecture there is shown a Web Application Client running in a Web Browser.

A) Permission is requested for access to a Microphone and/or Video Camera Media Device
B) Upon permission being granted, a Media Stream (https://w3c.github.io/mediacapture-main/#stream-api) is initialized
C) The Media Stream is provided to a Media Recorder (https://www.w3.org/TR/mediastream-recording)
D) Upon Start recording:
   a. the Media Recorder is configured to slice "Chunks" of the recording into Chunks of data which can be saved in any reasonable time length of the recording which is preferably from 0.5 to 60 seconds and is not to exceed 1 Megabyte (MB) in size. However, the most preferable length is 8 seconds,
   b. the File_name is created.

Every 8 seconds thereafter each "Chunk" is:
a. Encoded in Base64 format to convert it from a raw Array Buffer to a String,
b. Given a Date Time Stamp,
c. Saved to a Collection in a cloud database such as but not limited to Google Cloud Platform's Firestore Database.

Upon Stop recording an HTTP Post Request is sent to a server running in the Cloud containing:
a. The creator's identification/authorization token.
b. The reference path to the Collection on "Chunks" within a database
c. The File_name.

A POST request is an arbitrary amount of data of any type that can be sent to the server in the body of the request message. A header field in the POST request usually indicates the message body's Internet media type.

Therefore, referring to the Server running in the Cloud:
a. The reference path to the Collection on "Chunks" within Google Cloud Platform's Firestore Database is used to Get the "Chunks" ordered by the Date Time Stamp.
b. Each "Chunk" is Decoded from Base64 back to Array Buffer.
c. The Array Buffers are concatenated into a File Buffer.

d. The File Buffer is saved to disk using a multi-media container format with the provided File_name.
e. Audio Drift Normalization—the saved file from the multi-media container can be converted to an audio and/or video file format and then is normalized without reduction of quality using an Audio drift normalization application.
f. Media files are uploaded to a Cloud Storage Bucket within Google Cloud Platform with Public URLs being provided in return. The media formats can alternatively be any audio or video file format which provides an efficient data encoding format.
g. The Public URLs of the media files are saved to the Application Data within a database such as Google Cloud Platform's Firebase Real-Time Database using the Reference Path.

Referring to the audio drift normalization phase:

Audio recording devices tend to sample audio at one of two different rates, 44.1 kHz or 48 kHz. Audio files encoded with the Opus codec/encoder and stored within the WebM media file container format is processed by the FFMPEG open source audio/video utility in the following ways to standardize the output files.
a. If the Sample Rate is 44.1 kHz then resampled it to 48 kHz;
b. Synchronizing the wave forms if the input is stereo then sum it to mono;
c. Converts to WAV and MP3 container formats;
d. Saves WAV and MP3 files to disk.

Clarifying binary-to-text encoding schemes, Base64 is designed to carry data stored in binary formats across channels that only reliably support text content. Base64 is particularly prevalent on the World Wide Web where its uses include the ability to embed image files or other binary assets inside textual assets such as Hypertext Markup Language (HTML) and Cascading Style Sheets (CSS) files. However, any similar application/product could be used to achieve similar results.

It should be noted that WebM is an open, royalty-free, media file format designed for the web. WebM defines the file container structure, video and audio formats. WebM files consist of video streams compressed with the VP8 or VP9 video codecs and audio streams compressed with the Vorbis audio compression or Opus audio coder-decoder which is a real-time interactive audio coder-decoder. However, any similar application/product could be used to achieve similar results.

A WAV file is a raw audio format that are uncompressed lossless audio and as such can take up quite a bit of space, coming in around 10 MB per minute with a maximum file size of 4 GB. However, any similar application/product could be used to achieve similar results.

An MP3 file is an audio file saved in a compressed audio format developed by the Moving Picture Experts Group (MPEG) that uses "Layer 3" audio compression. However, any similar application/product could be used to achieve similar results.

WAV and MP3 are protocols for converting the audio or video data to the associated file formats.

The term WAV, MPS, audio, video file, AVI (Audio Video Interleave), FLV (Flash Video Format), WMV (Windows Media Video), MOV (Apple QuickTime Movie), MP4 (Moving Pictures Expert Group 4) are used interchangeably within the specification and are all forms of media files.

The term codec is a device or computer program for encoding or decoding a digital data stream or signal. Codec is a portmanteau of coder-decoder. A coder encodes a data stream or a signal for transmission or storage, possibly in encrypted form, and the decoder function reverses the encoding for playback or editing.

The term FFMPEG is a free and open-source project consisting of a vast software suite of libraries and programs for handling video, audio, and other multimedia files and streams.

Figure 2:
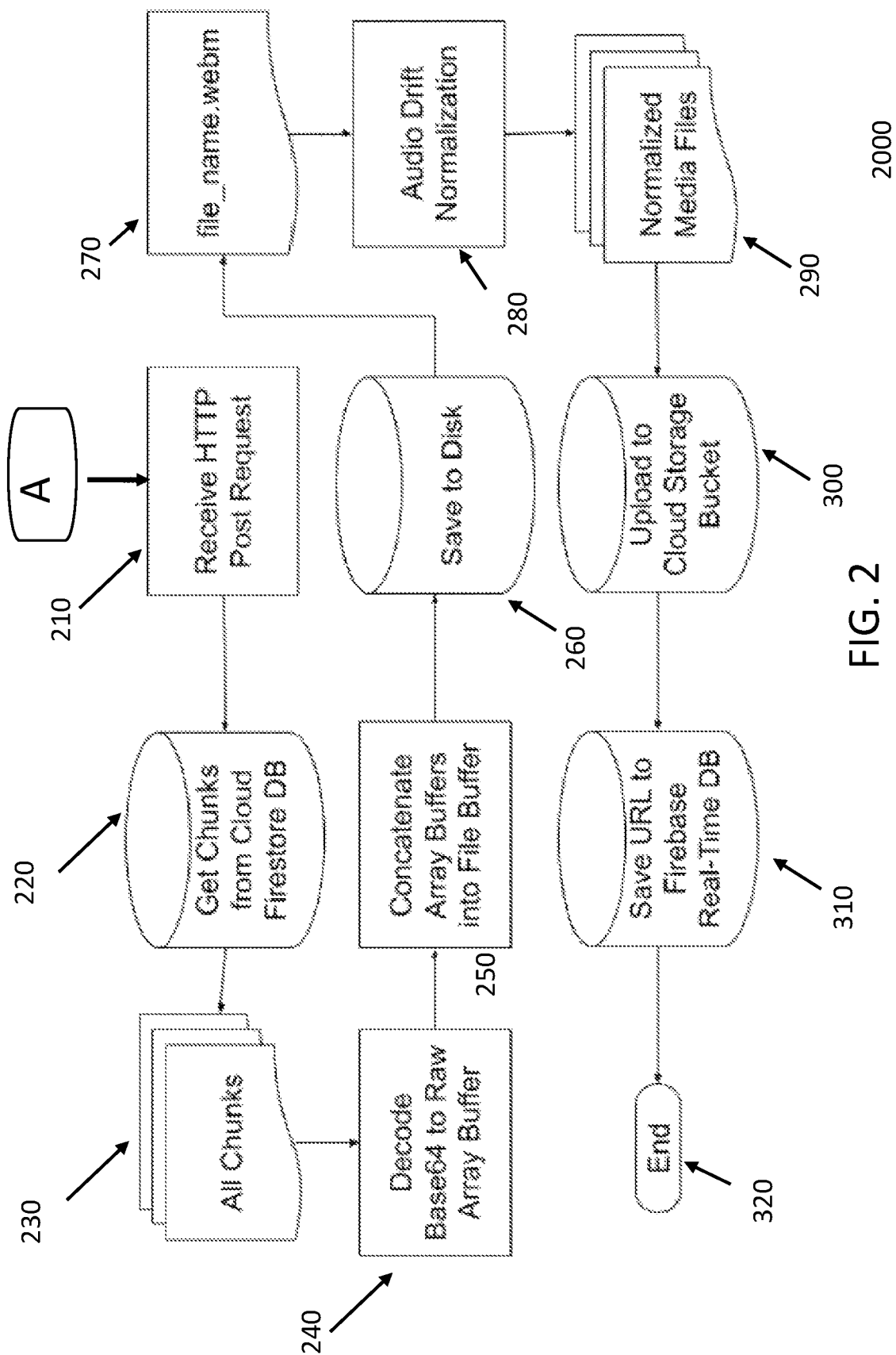
FIG. 2 is a method flowchart for simultaneous recording audio files in accordance with an embodiment of the present invention.
Figure 3:
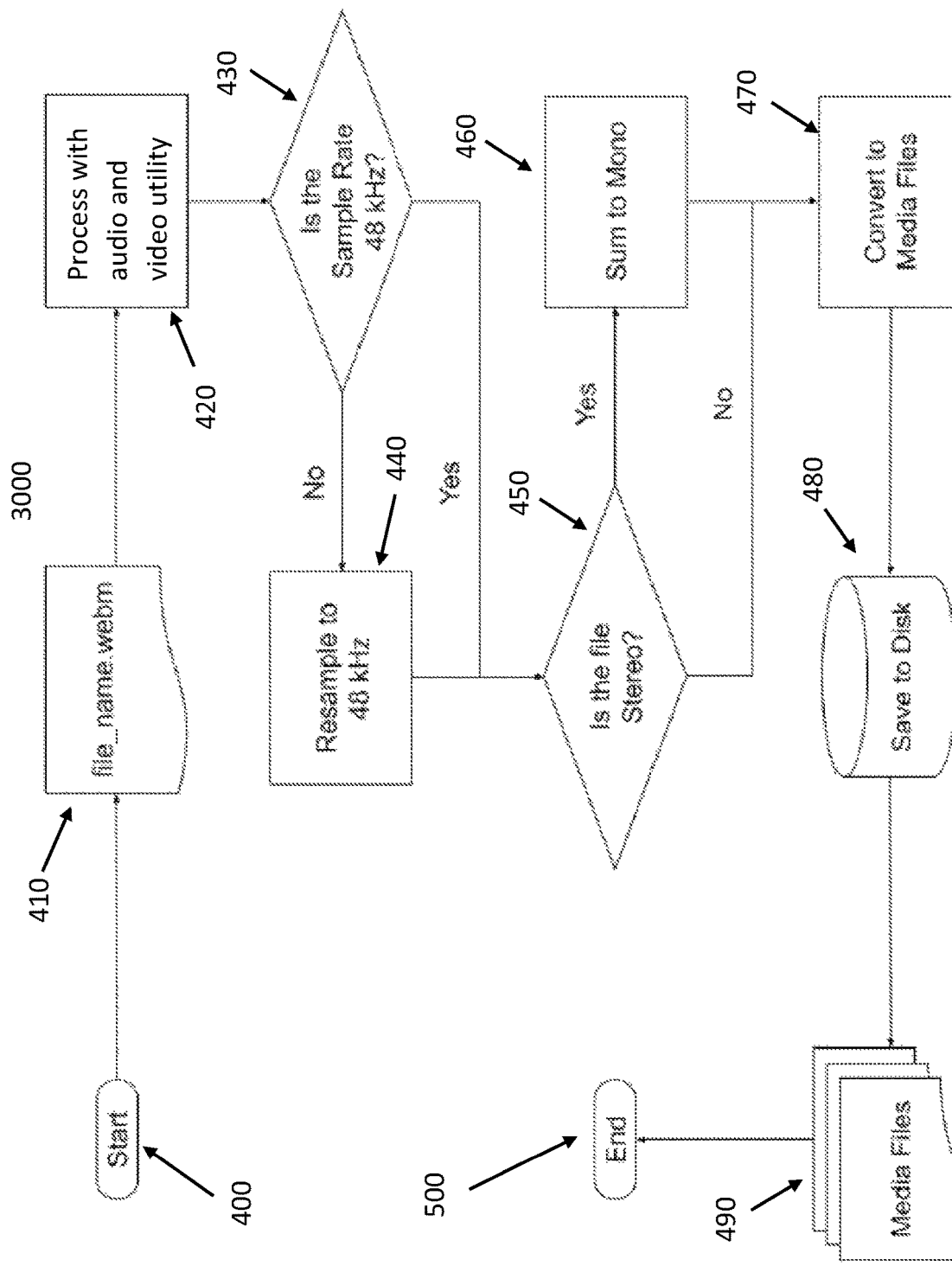
FIG. 3 is a method flow chart for audio drift normalization in accordance with an embodiment of the present invention.

Referring now to the drawings as shown in FIGS. 1, 2 and 3, and more particularly to FIG. 1, there is shown a Client Server software architecture of the invention web application 1000. The server side is shown in FIG. 2 server application. By splitting the invention into two separate components, client side and web side, the invention increases the efficiency of the transfer.

The application of the invention starts at step 10 which resides on the client side of the application on a web application running on a computing device. The client computing device being in communication with a microphone. The client application then requests permission to access the microphone step 20. Once permission has been received to access the microphone or video capture device, the media stream is initialized by the web application 1000 as shown in step 30. The media recorder 40 is enabled so as to be capable of receiving the microphone and/or video camera media stream. The microphone and/or video camera sends a start recoding signal. When the start recording signal step 50 is received by the web application 1000, then the client side web application opens a file step 60 and starts media recorder that records data from the microphone and/or camera media stream and stores it in the file. The web application 1000 then creates a chunk and appends a name to the file for identification purposes. The segments are based on a preset time period. The recorded data is then segmented into chunks of data step 70. Chunks of data can be saved in any reasonable time length of the recording which is preferably from 0.5 to 60 seconds. However, the most preferable length is 8 seconds and is not to exceed 1 Megabyte (MB) in size.

The recorded data is recorded until said recording device sends stop recording signal to receive the web application 1000. Then the chunks of data represented by the files with the name created in step 60 and an appended sequence number which starts a 1 and the sequence number stop with an integer value equal to the number of files, therefore sequence number two would equal 1+1 which equals 2. The files are then converted to Base64 encoded raw data chunk and placed in an array buffer in step 80 using the name assigned to the chunk in step 70. The Base64 encoded raw data chunk is then encoded with a date and time stamp in step 90 which is the transfer chunk and that transfer chunk is uploaded to the cloud and stored in a Firestore database. However, any similar database application/product could be used to achieve similar results such as Oracle, Zoho Creator, Quick Base, Amazon Aurora, Kintone, Amazon RDS, Rubrik, Airtable, Knack, TeamDesk, Firebolt or Firestore.

The media recorder step 40 has a second feature which is continually sensing the device for the stop recording signal step 120. Once the stop recording signal is received, the web application 1000 processes and sends HTTP Post request step 110 to the cloud server where the chunks are stored in the Firestore database via link A.

Referring now to FIG. 2, there is shown the cloud server application where the chunks of data are stored. Step 210 receives the HTTP post request sent from the client application step 110 on FIG. 1 and retrieves the data from the Firestore database step 220. The Firestore database can be replaced with any similar application capable of storing text, binary, ASCII, audio or video files. Once all the chunks of data have been received, the files are organized by the name created in step 60 of FIG. 1 in step 230. Step 240 the application 2000 decodes the Base64 and stores the results in an array buffer. The application 2000 does this for all the chunks of step 230 until the complete recording is decoded and each file is identified by the name created in step 60 of FIG. 1 in step 230 plus a sequence number or identifier. Step 250 takes decoded data from step 240 and concatenates the files into a file buffer where the media, audio or video file is recreated. Once the concatenated file is created it is stored to the server storage medium step 260 in an audiovisual media file format such as webm. The server storage medium can be any suitable technology including random and serial data storage media such as a disk drive or electronic media accessible by the server running application 2000. The storage medium does not have to be contained in the same server but can be a networked device. In step 270 the file stored in an audiovisual media file format in step 260 which is identified by the name created in step 60 of FIG. 1 plus a sequence number or identifier assigned in step 230. Step 280 of application 2000 then operates on the file from step 270 and creates a WAV and or MP3 file in step 290. The term WAV, MPS, audio, video file, AVI (Audio Video Interleave), FLV (Flash Video Format), WMV (Windows Media Video), MOV (Apple QuickTime Movie), MP4 (Moving Pictures Expert Group 4) are used interchangeably within the specification and are all forms of media files. Step 300 then stores the newly created WAV or MP3 file in a cloud storage bucket. The term cloud storage buckets are the basic containers on the Google or Amazon cloud that contains the data. However, any suitable storage medium could be used. Step 310 then stores the public URL of the cloud storage bucket to the Firebase real time database however any suitable database application can be employed. Once the WAV or MP3 file and associated public are stored the application 2000 ends step 320.

Referring to FIG. 3, there is shown the audio drift normalization process 280 from FIG. 2. The process begins in step 400 where the process receives from step 270 of application 2000 the audiovisual media file format stored in step 260 as shown in FIG. 2. The audiovisual media file format can be any file format which is applicable such as WebM, AVI, MPEG transport stream, Matroska, F4V, Vob, Ogg Video, 3GPP2, SVI, AMV video format, MPEG-1, MPEG-4, MPEG transport stream, QuickTime file format and Windows media video. The process then places the file into queue 410 within the server storage system comprising of a direct access storage device (DASD) or non-volatile computer storage, an example of which is solid state storage medium for further processing. Step 420 utilizes the WebM container media file format files and then processes them with the FFMPEG open source audio and video utility in the following ways to standardize the output files. In step 430 the process determines the sample rate of the file. If the sample rate is not 48 kHz then the file is resampled to 48 kHz in step 440. Resampling, in terms of audio files, is also known as Sample Rate Conversion. This is done when you need to convert a digital audio file from a given sample rate into a different sample rate. Sample rate is the number of samples of audio carried per second, measured in Hz or kHz (one kHz being 1,000 Hz). If the file is 48 kHz, the file is then passed to step 450. The audio drift normalization process has now synchronized the wave forms and determines if the input file is in stereo or mono 450. If the input file is stereo, the process sums the file to mono 460 else the file is passed to step 470. Summing a stereo media file to mono means taking both channels of your stereo media file (left and right) and creating a composite single mono media file. In step 470, the file is converted to media file such as a WAV and MP3 container formats. However, any applicable media file such as a WAV, MPS, AVI, FLV, WMV, MOV, MP3 and MP4 is acceptable. The process then saves the media file to disk step 480. However, any suitable storage medium can be substituted such as a database, files or stacks all of which can reside on a Direct Access Storage Device (DASD) or non-volatile computer storage such as a solid state storage medium. The WAV and MP3 files are stored in separate files step 490 for further processing. The process then returns control of the file to application 2000 step 280 as shown in FIG. 2.

The audio drift normalization can be implemented separately from the recording applications 1000 and 2000 shown in FIG. 1 and FIG. 2. The utilizing application must provide the correct file format and be able to receive the file format being returned from application 3000.

In some embodiments, the system, method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, gaming controller microphone or camera. For example, a user input may indicate a request that a certain task is to be executed by the computing system, such as requesting the computing system to display any of the above described information, or requesting that the user inputs updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings, disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

What is claimed is:

1. A system comprising:
    a first application program executing on a computing device that is accessible to a speaker, wherein the first application program is configured to:
        acquiring a stream of media that originates on the computing device,
        segment the media into multiple segments having a predetermined length and arranged in a sequential order,
        store each of the multiple segments in a different one of multiple files,
        establish, for each of the multiple segments, a number that is representative of a placement in the sequential order,
        encode each of the multiple files using a binary-to-text encoding scheme, so as to produce multiple encoded files,
        populate the multiple encoded files in a first array buffer using names created upon creation of the multiple files,
        transmit the multiple encoded files, one by one, to a cloud storage system for storage,
        monitor for a signal, from the computing device, to stop generating the media, and
        in response to receiving the signal,
            stop saving the media and transmit a request to a second application program that is executing on a computer server accessible to the computing device via a network; and
    the second application program that is configured to:
        in response to receiving the request from the first application program,
            retrieve the multiple encoded files from the cloud storage system,
            decode each of the multiple encoded files, so as to reproduce the multiple files that are populated in a second array buffer until each of the multiple files is identifiable by a corresponding one of the names created by the first application program,
            concatenate the multiple files in a file buffer to create a concatenated file that is representative of the stream of the media, and
            store the concatenated file in a storage medium.

2. The system of claim 1, wherein the request is transmitted in accordance with a POST request method supported by Hypertext Transfer Protocol (HTTP).

3. The system of claim 1, wherein the storage medium is part of a networked computing device that is accessible to the computer server via a second network.

4. The system of claim 1, wherein the second application program is further configured to convert the concatenated file from a first format to a second format.

5. The system of claim 4, wherein the second application program is further configured to store the concatenated file, in the second format, in a container of the cloud storage system.

6. The system of claim 5,
    wherein when the second application program stores the concatenated file, in the second format, in the container of the cloud storage system, a Uniform Resource Locator (URL) is provided in return, and
    wherein the second application program is further configured to save the URL of the container to a database.

7. The system of claim 1, wherein the second application program is further configured to perform an audio drift normalization operation using the concatenated file.

8. The system of claim 7, wherein as part of the audio drift normalization operation, the second application program:
    determines a sampling rate of the concatenated file,
    resamples the concatenated file in response to a determination that the sampling rate is not a predetermined value,
    determines whether the concatenated file is in stereo sound,
    sums the concatenated file to mono sound in response to a determination that the concatenated file is in stereo sound, and
    converts the concatenated file into a predetermined format.

9. The system of claim 8, wherein to sum the concatenated file to mono sound, the second application program creates a single composite channel from a left channel and a right channel separately represented in the concatenated file.

10. The system of claim 1, wherein the computer server is part of the cloud storage system.

11. The system of claim 1, wherein the first application program is further configured to request, from the computing device, permission to access a microphone that generates the media.

12. The system of claim 1, wherein the first application program is further configured to request, from the computing device, permission to access a video capture device that generates the media.

13. The system of claim 1, wherein the first application program is further configured to create the multiple files, as the multiple segments are produced, in response to receiving input indicative of an approval to record the media.

14. The system of claim 1, wherein the first application program is further configured to encode each of the multiple encoded files with a timestamp.

* * * * *